United States Patent [19]

Miller et al.

[11] Patent Number: 4,485,183

[45] Date of Patent: Nov. 27, 1984

[54] REGENERATION AND REACTIVATION OF DEACTIVATED HYDROREFINING CATALYST

[75] Inventors: Richard B. Miller, Costa Mesa; Ryden L. Richardson, Whittier, both of Calif.

[73] Assignee: Union Oil Company of California, Los Angeles, Calif.

[21] Appl. No.: 367,367

[22] Filed: Apr. 12, 1982

[51] Int. Cl.$^3$ .................. B01J 23/94; B01J 27/04; C10G 45/08; C10G 49/04

[52] U.S. Cl. .................... 502/25; 208/216 R; 208/251 H; 502/26; 502/27; 502/28; 502/38; 502/516; 502/517; 502/211

[58] Field of Search ............... 252/416, 419, 411–415; 502/25, 26, 27, 22, 38, 516, 517

[56] References Cited

U.S. PATENT DOCUMENTS

| | | | |
|---|---|---|---|
| 2,346,970 | 12/1944 | Gwynn | 252/413 |
| 2,977,322 | 3/1961 | Varvel et al. | 252/411 |
| 3,256,205 | 6/1966 | Constabaris et al. | 252/413 |
| 3,287,280 | 11/1966 | Colgan et al. | 252/435 |
| 3,791,989 | 2/1974 | Mitchell et al. | 252/413 |
| 3,840,472 | 10/1974 | Colgan et al. | 252/435 |
| 4,014,815 | 3/1977 | Gamble, Jr. et al. | 252/412 |
| 4,038,209 | 7/1977 | Schoofs | 252/419 |
| 4,072,629 | 2/1978 | Janssen | 252/416 |
| 4,089,806 | 5/1978 | Farrell et al. | 252/413 |
| 4,178,267 | 12/1979 | McKay | 252/411 R |
| 4,207,204 | 6/1980 | McKay et al. | 252/411 R |
| 4,268,415 | 5/1981 | Mohan et al. | 252/413 |
| 4,272,400 | 6/1981 | Silbernagel et al. | 252/413 |
| 4,272,401 | 6/1981 | Mohan et al. | 252/413 |
| 4,321,128 | 3/1982 | Yoo | 208/114 |
| 4,381,993 | 5/1983 | Nevitt | 208/251 H |
| 4,392,985 | 7/1983 | Millman | 208/216 R |
| 4,395,329 | 7/1983 | Le Page et al. | 252/437 |

FOREIGN PATENT DOCUMENTS 52-73193  6/1977  Japan ..................... 252/413

Primary Examiner—P. E. Konopka
Attorney, Agent, or Firm—Dean Sandford; Gregory F. Wirzbicki; Alan H. Thompson

[57] ABSTRACT

Deactivated hydrorefining catalysts are regenerated by incorporation of as phosphorus component followed by combustive coke-removal from the catalyst. The regenerated catalyst is useful for promoting hydrodesulfurization reactions, particularly those involving demetallation of hydrocarbons.

24 Claims, No Drawings

REGENERATION AND REACTIVATION OF DEACTIVATED HYDROREFINING CATALYST

BACKGROUND OF THE INVENTION

1. Field of the Invention

The present invention is related to regeneration and reactivation of spent or deactivated catalysts used in hydrorefining processes, and, more particularly, to a method for regenerating deactivated catalysts employed in hydrodesulfurization.

2. Description of the Prior Art

Hydrorefining of hydrocarbons is usually carried out with a particulate catalyst comprised of a refractory oxide support containing Group VIB and Group VIII metals. Typically, catalysts comprising cobalt and molybdenum components supported on alumina are utilized in hydrodesulfurizing hydrocarbon feedstocks so as to reduce high concentrations of sulfur as well as contaminant metals such as vanadium and nickel. Although these catalysts are highly useful in reducing sulfur and contaminant metals from hydrocarbons, the activity of such catalysts is diminished during the course of processing as a result of deposition of contaminant metal and carbon residues (coke) on the catalyst. Coke deposit reduces the effective surface area and pore size of the catalyst, while the heavy contaminant metals, particularly vanadium, tend to poison the catalyst and plug the pores. During the course of processing, the operating temperature must be increased to compensate for the coking, plugging, and poisoning effects, but the higher temperature increases coking and further deactivates the catalyst. Eventually, the required temperature increase to maintain a desired amount of sulfur and metals removal becomes intolerable, and the catalyst is removed, deactivated due to metals and/or coke deposits.

Regeneration of coked and metal-contaminated catalysts back to a catalytically active form has been the subject of much investigation, and a number of approaches for regenerating hydrodesulfurization catalysts by removal of deposited metals have been developed. Acidic media such as mineral acids, anhydrous HF, oxalic acid, other carboxylic acids and even acidified amine solutions have been employed. Other approaches include the use of hydrogen peroxide and chlorinating agents, as well as high temperature treatment with sulfur, as note U.S. Pat. Nos. 3,562,150, 4,216,118, and 4,014,815, respectively. However, such approaches (1) do not restore a sufficiently high degree of catalytic activity, (2) result in loss of strength of the support material, or (3) result in an unacceptable loss of active metals, such that catalytic activity of the regenerated catalyst is considerably inferior to the fresh catalyst.

It is therefore an object of this invention to provide a method for regenerating a hydrorefining catalyst such that no appreciable loss of support strength and essentially full recovery of catalytic activity result.

Another object is to reactivate a deactivated hydrorefining catalyst by restoring an appreciable amount of active metal components to the catalyst as well as by removing essentially all the coke and maintaining or improving the support strength.

Still another object is to provide a hydrorefining process, and most particularly a hydrodesulfurization process, using catalysts reactivated by the method of the invention. These and other objects and advantages of the invention will become apparent from the following description.

SUMMARY OF THE INVENTION

Briefly, the invention provides a method for regenerating a coke-containing, deactivated hydrorefining catalyst by contacting a phosphorus component with the deactivated catalyst followed by combustion of essentially all the coke. Ordinarily the phosphorus is added to particulates of the deactivated catalyst, but it also may be added to a crushed form thereof.

In one embodiment of the invention, a deactivated hydrodesulfurization catalyst is first treated so as to remove vanadium, nickel and other metal contaminants, then mildly heated to combust or remove the more volatile coke, and subsequently incorporated with a phosphorus component prior to combusting essentially the remainder of the coke from the catalyst. In another embodiment, active metal components, such as cobalt and molybdenum, are restored to the surface of the catalyst between coke-removal steps. In yet another embodiment, after the final combustion step, the resulting catalyst, essentially free of coke, is crushed, mixed with a binding agent, reformulated into particulates and calcined.

DETAILED DESCRIPTION OF THE INVENTION

In accordance with the present invention, a deactivated hydrorefining catalyst is regenerated by combusting a substantial proportion of sulfur-containing coke deposits from the catalyst in the presence of phosphorus components.

Conventional hydrorefining catalysts which may be regenerated in accordance with the invention usually comprise Group VIB and VIII active metal components on a support, with the active metal components usually being selected from the group consisting of cobalt, nickel, molybdenum, tungsten, and the oxides and sulfides of the foregoing. Hydrodesulfurization catalysts are preferred with active metal components comprising cobalt and molybdenum. The support material is usually a porous refractory oxide, but other essentially inert supports are also useful. In the preferred embodiment, however, the deactivated catalyst comprises a support material containing alumina, and more preferably silica-stabilized alumina.

In hydrorefining, these catalysts deactivate by accumulations of sulfur-containing coke deposits and of nickel and vanadium contaminant metals in the pores of the catalyst. Also, the surface area and crushing strength of the catalysts decrease during hydrocarbon processing. The method of the invention is most often used to regenerate deactivated hydrodesulfurization catalysts that usually have average crushing strengths greater than 5 lbs/$\frac{1}{8}$ inch length of catalyst particulate, have lost a substantial amount of surface area, and ordinarily contain greater than 5 weight percent of nickel plus vanadium, at least 0.5 weight percent and usually about 2 to about 20 weight percent of coke deposits, or combinations thereof. Relative amounts of coke deposits and nickel or vanadium metals found on the deactivated catalyst may vary, depending upon their location in a hydrodesulfurization reactor unit. For example, in a train of reactors used in severe hydrodesulfurization, deactivated catalysts removed from upstream reactors that emphasize demetallation contain relatively high percentages of vanadium plus nickel metal contaminants, usually greater than 10 weight percent and even greater than 20 weight percent, while containing about 1 to about 10 weight percent of coke deposits. On the other hand, catalysts removed from downstream reactor positions usually contain relatively high percentages of coke deposits due to their emphasis on sulfur-removal, and typically contain greater than 10 weight percent and usually upwards to 20 weight percent or more of coke, while the accompanying vanadium plus nickel metal contaminants may be found in less than 10 weight percent.

After removal from a reactor vessel, the deactivated catalyst particles are optionally precleaned with an organic solvent or even hydrogen gas to remove contaminating surface oils prior to regeneration. For precleaning, any of a number of organic solvents are effective, as for example, hydrocarbons comprising aliphatics, aromatics, cyclo-paraffins, or mixtures of these, with those solvents boiling below about 500° F. being preferred. Examples of suitable organic solvents include decane, benzene, toluene, xylene, cyclohexane, tetralin, as well as cracked naphtha.

In the method of the invention, sulfur-containing coke deposits are removed, primarily by combustion, from a deactivated catalyst containing an added phosphorous component. De-coking in the absence of phosphorus by combustion releases $SO_2$ from the sulfur on the catalyst, which $SO_2$, in the presence of $O_2$ and the large quantities of vanadium contaminants on the catalyst, is converted at least in part to $SO_3$. During combustion, the produced $SO_3$ available $SO_2$ plus $O_2$ during combustion attacks most hydrorefining catalyst supports (and sometimes the active metals thereon) by sulfation, and as a result, the crushing strength, pore volume, surface area, and activity of the catalyst are often reduced. It is believed that vanadium on the deactivated catalyst is initially in the $+3$ or $+4$ oxidation states in such forms as $V_2S_3$ or $VS_2$, and when a sufficient threshold temperature is surpassed, the vanadium is then converted to the $+5$ oxidation state, suitable for promoting the $SO_2$ conversion to $SO_3$. Incorporation of phosphorus components with the deactivated catalyst is thought to "passivate," or inhibit by some chemical reaction mechanism, the vanadium conversion to the $+5$ oxidation state and thereby inhibit the sulfation mechanism.

In accordance with the invention, a phosphorus component is contacted with the deactivated catalyst. Elemental phosphorus may be utilized for this purpose, as may compounds of phosphorus further containing a metal; however, in the preferred embodiment of the invention, a non-metallic phosphorus compound is employed, for example, metaphosphoric acid, hydrophosphorous acid, phosphorous acid, pyrophosphoric acid, and preferably orthophosphoric acid. Other phosphorus compounds useful in the invention include ammonium monohydrogen phosphate, ammonium dihydrogen phosphates, and ammonium phosphate.

The deactivated catalyst is contacted with the phosphorus component or components by conventional methods such as mulling, comulling, impregnation and mixing. Mulling or comulling is generally preferred with crushed deactivated catalyst, but impregnation, including those impregnation techniques involving pore saturation and incipient wetness, is preferred with uncrushed catalyst. Impregnation of uncrushed particulates is usually followed by aging from about three quarter to two hours, sufficient to allow uniform phosphorus dispersion on the catalyst surface.

The phosphorus components are added to the deactivated catalyst in amounts such that the resulting phosphorus to vanadium metal atom ratio is between about 0.1 and 4.0, and preferably 0.5 to 2.0, phosphorus to vanadium metal, both expressed as the free elements. In the preferred embodiment of the invention, no substantial loss of contaminant metals results during the contact of the added phosphorus component or components with the catalyst.

After addition of the phosphorus components, the catalyst is dried, following which the coke deposits, usually present in an amount greater than about 0.5 weight percent of the catalyst, are combusted in the presence of oxygen at a temperature usually in the range from about 600° F. to about 1500° F., and preferably from about 700° F. to about 1300° F. for periods ranging from 1 to 12 hours or more. The coke combustion at these temperatures may be termed the "high temperature coke-removal step." The catalyst resulting from the high temperature coke-removal step is essentially coke-free, usually containing less than about 0.5 weight percent coke, preferably less than about 0.15 weight percent coke, and most preferably less than 0.10 weight percent coke. Also, the resulting catalyst typically contains at least 1 weight percent of phosphorus components, and preferably greater than 2 weight percent, calculated as P. Additionally, there is no substantial loss of nickel and vanadium metal contaminants from the catalyst during the high temperature coke-removal step.

Due to the presence of phosphorus during the high temperature coke-removal step, no significant sulfation of the support material occurs. The degree of sulfation is evidenced directly by the weight percent of sulfur remaining on the decoked catalyst and indirectly by no decrease in the surface area of the catalyst. When the regenerated catalyst contains less than about 0.5, preferably less than about 0.3, and most preferably less than about 0.1 weight percent of sulfur, as determined by analytical techniques using emission spectroscopy, then essentially no sulfation of the support material is indicated to have occurred during coke removal. Another indication of insignificant sulfation during coke removal is the lack of decrease of the surface area of the regenerated catalyst relative to the deactivated catalyst. Typically the surface area of the regenerated catalyst, as determined by the B.E.T. method, is at least maintained, but preferably increased greater than 50 percent and most preferably greater than 100 percent in comparison to the deactivated catalyst. Ordinarily, the surface area of the regenerated catalyst is greater than about 60 m²/gram, but preferably greater than about 100 m²/gram, and most preferably greater than 200 m²/gram.

An effect of essentially no sulfation of the support material aids the maintenance of the crushing strength of the regenerated catalytic particulates as compared to the original fresh catalytic particles and aids the improvement of crushing strength as compared to the deactivated catalyst. An average crushing strength of particulates greater than 8 lbs/⅛ inch length, and preferably greater than 10 lbs/⅛ inch length is effective to avoid deterioration and collapse of stressed catalyst particulates that cause unacceptable hydrocarbon feedstock pressure loss through a loaded hydrorefining reactor.

Catalyst crushing strength lost due to deactivation may be restored or improved by controlling the amount of phosphorus components incorporated with the catalyst prior to the high temperature coke-removal step of the invention. Usually, increasing amounts of phosphorus components on the regenerated catalyst particulates increase the crushing strength of the catalyst, typically on the order of up to 2 lbs/⅛ inch length for each additional weight percent of phosphorus on the finished catalyst (phosphorus component calculated as P), but usually the increase is in the range of about 0.5 to about 1.5 lbs/⅛ inch length per weight percent of P.

In one embodiment of the invention, the deactivated catalyst is crushed and subsequently reformulated into a particulate form and calcined. For example, deactivated catalyst particulates are pre-cleaned with organic solvent and then crushed by conventional size-reducing means such as mulling, grinding, or hammer milling. The crushed catalyst is contacted with phosphorus components and then heated to an elevated temperature, preferably accompanied by agitation or stirring, resulting in the removal of essentially all the coke deposits. The coke-deficient crushed catalyst, mixed with a strength-improving binding agent, such as an alumina hydrogel or hydrosol, is prepared in the form of shaped particulates by methods well known in the art. About 10 to 25 weight percent of alumina binder is required to restore or improve the particulate crushing strength (i.e., to at least about 10 lbs/⅛ inch length) as compared to the original catalyst. Also, the addition of binding agent increases the average pore size distribution of the catalyst.

It is noted that in those embodiments involving crushing and reformulation some deactivated catalysts contain a high percentage of plugged outer pores due to nickel and vanadium contaminant metal accumulation in addition to coke deposit, and the reformulation of these crushed coke-deficient catalysts tends to more uniformly distribute the metal contaminants throughout each particulate. More uniformly distributed metal contaminants enhance the desulfurization and demetallation activity of the regenerated catalyst.

A preferred method for preparing catalyst particulates is to extrude a mixture of a gel and the crushed coke-deficient catalyst through a die having openings therein of desired cross-sectional size and shape, after which the extruded matter is cut into extrudates of desired length. Preferred particles are of cylindrical shape having a cross-sectional diameter of 1/32 to ¼ inch and a length of 1/32 to ¾ inch. Also preferred are particulates having lengths between 1/32 and ¾ inch and having cross-sectional shapes resembling that of a three-leaf clover, as shown, for example, in FIGS. 8 and 8A of U.S. Pat. No. 4,028,277. Preferred clover-shaped particulates are such that each "leaf" of the cross-section is defined by about a 270° arc of a circle having a diameter between about 0.02 and 0.06 inches. The extrudates are usually calcined above about 900° F. so as to convert the binding agent gel to a refractory oxide matrix such as gamma alumina. Preferably, temperatures above 1100° F. are utilized to effect this transformation, with holding periods of about one to three hours generally being utilized to produce preferred alumina-containing catalyst extrudates. As a result of the extrusion method, these "re-extrudates," as compared to the deactivated catalyst, have improved surface area, pore volume, pore size and activity, and further have similar or improved crushing strength.

In another embodiment of the invention, a number of pores of the deactivated catalyst are unplugged by mild combustion of coke deposits in the presence of oxygen prior to incorporation of phosphorus components with the catalyst. The deactivated catalyst particulates are mildly heated to a temperature sufficient to combust at least part of the coke deposits to $CO_2$ but insufficient to significantly sulfate the catalyst and result in surface area loss. After the mild combustion and yet prior to incorporation of phosphorus, the catalyst still contains at least 0.5 weight percent, and usually about 1 to about 10 weight percent of coke deposits. The weight percent of remaining coke may vary depending upon the original amount of coke on the catalyst and the operating conditions of the mild combustion step. The temperatures suitable for the mild combustion of coke depend to a great extent upon the support material, but usually temperatures of about 250° F. to 600° F., and preferably from about 350° F. to about 500° F., coupled with holding periods of about one to twelve hours, are effective.

In yet another embodiment of the invention which is highly preferred, the mild heat treatment is preceded or immediately followed by an extraction of the vanadium and nickel metal contaminants by employing an acidic extraction solution. A preferred metals extraction method, as disclosed in U.S. Pat. No. 4,089,806, utilizes an aqueous extraction solution containing oxalic acid and one or more water-soluble nitrate-containing compounds such as nitric acid and water-soluble inorganic nitrate salts.

A most highly preferred metals extraction method is employed prior to the mild heat treatment and includes procedure and solutions similar to those found in the above-disclosed patent. The preferred extraction solution contains nitrate ions from a dissolved nitrate salt in a concentration between about 5 and 125 grams/liter and oxalic acid in a concentration above 10 grams/liter and not necessarily saturated. More suitable aqueous solutions contain nitrate ions in a concentration between 15 and 60 grams/liter and oxalic acid in a concentration from about 20 to about 90 grams/liter. It should be noted that concentrations are functional with the temperature at which the catalyst is contacted. For example, a high concentration of the nitrate ions, such as about 125 grams/liter, requires a relatively low temperature of contacting. Also, a temperature of contacting greater than 150° F. for extended periods of time may result in catalyst disintegration.

The extraction solution and the deactivated catalyst are contacted in any of a number of convenient ways such as soaking in the extraction solution or recycling the solution through the particulates. The following Table I sets forth the contacting conditions for use herein:

TABLE I

|  | Suitable | Preferred |
|---|---|---|
| pH | 0–4 | 0.5–1.5 |
| Temperature, °F. | 30–150 | 60–80 |
| Time, hours | 0.75–500 | 2–20 |
| Ratio of Volume of Solution to Catalyst Weight l/gram | 0.005–10 | 0.05–1 |

The amount of metals removed from hydrorefining catalysts contacted with the described extraction solutions will vary depending upon the original amounts of contaminant metals. Generally, between about 5 and 95 weight percent of both vanadium and nickel contaminant metals may be removed by employing the preferred methods, but in the more preferred embodiment between about 25 and 90 weight percent of each contaminant are removed, and most preferably between about 60 and 85 weight percent of each contaminant.

In addition to contaminant metal removal, typical metals extraction methods may result in the loss of some active catalyst components or support material. For example, after contaminant metals have been extracted from a deactivated catalyst originally having approximately 12 weight percent molybdenum components, calculated as $MoO_3$, and 4 weight percent cobalt components, calculated as CoO, the resulting catalyst may have only 8 weight percent molybdenum and 3 weight percent cobalt, calculated on a fresh catalyst basis. In the most highly preferred embodiment of the invention, such active components may be restored to the catalyst by conventional contacting methods. Following both a contaminant metals extraction step and a mild heat treatment, the catalyst is contacted with an aqueous impregnation solution containing sufficient Group VIB and/or Group VIII metal components and calcined to restore desired weight percentages of the active components. Orthophosphoric acid, or another comparable phosphorous component, may be added to the aqueous impregnation solution to enhance the solubility of the Group VIB metal components in addition to inhibiting sulfation or surface area loss to the catalyst during subsequent high temperature coke-removal. A phosphorous component used in this manner allows the high temperature coke-removal step to also serve as a calcination stop for converting an added active component to one or more oxide forms. The reimpregnated catalysts are conventionally calcined at temperatures similar to those utilized in the high-temperature coke-removal step, usually greater than 800° F., but preferably greater than 1100° F., so as to result in compositions containing about 4 to about 24 weight percent of Group VIB metal components, calculated as the trioxide, about 1 to about 8 weight percent of Group VIII metal components, calculated as the monoxide, and about 1 to about 10 weight percent of phosphorous components, calculated as P. It is highly preferred that the resulting calcined catalyst be subsequently crushed and reformulated into particulates as hereinbefore described.

Catalysts regenerated by the method of the invention may have greater than 100 percent of their original activity restored depending upon the particular modification chosen and/or the particular use intended when returned to service. For example, when active components are reimpregnated on the deactivated catalyst, upwards to 200 percent of the original activity is obtained and the catalyst may be used for its original purpose. The regenerated catalyst will usually have at least 30 percent, preferably at least 50 percent and most preferably greater than 80 percent of its original activity. Also, the activity of a regenerated catalyst, if not 100 percent restored for its original use, may be acceptable for another purpose. For example, a reimpregnated and reformulated hydrodesulfurization catalyst of the invention, previously utilized in a process to primarily remove sulfur from a residual hydrocarbon fraction, may be employed in a similar process emphasizing metals removal.

The regenerated catalyst is usually suitable for use in a number of hydrorefining processes, especially the process from which the catalyst is removed in a deactivated form. The catalysts preferably treated by the regeneration method herein are hydrodesulfurization catalysts, and most preferably, the regenerated hydrodesulfurization catalyst is used in an application emphasizing demetallization, i.e., the removal of contaminant metals vanadium and nickel as well as iron, sodium, zinc, copper, and arsenic.

Feedstocks contemplated herein include broadly all liquid hydrocarbon mixtures, including whole crudes, which contain metals in a total concentration above about 30 ppmw, preferably between about 50 and 1000 ppmw. However, since the metallic poisons which deactivate hydrorefining catalysts are generally associated with asphaltene components of the oil, the process will be more commonly applied to the higher boiling fractions in which the asphaltene components concentrate. Especially contemplated are atmospheric and vacuum distillation residua containing more than 1.0 weight percent sulfur and more than 50 ppmw of nickel plus vanadium. Typical feedstocks include those having an API gravity between 6 and 30 and preferably between 10 and 25 degrees. However, one skilled in the art may choose to increase the API gravity of the feedstock by, for example, blending it with one of a higher degree so as to complement existing commercial refining equipment.

Hydrorefining, including hydrotreating and especially hydrodesulfurization, is herein carried out by contacting the feedstock in a hydrogen atmosphere at elevated temperatures and pressures with one or more of the previously mentioned catalysts. It is highly preferred that the process is performed in a train of several reactors required for severe hydrodesulfurization prior to other catalytic refining operations such as cracking, hydrocracking and/or hydrotreating. Although the regenerated catalyst particles may be returned to use in any position in the train, be it upstream, the same, or downstream from their original use as a fresh catalyst, it is preferred that the catalyst particles be used in an upstream reacting position, especially in the first reactor. When the regenerated catalyst is used in this manner, it not only is active for moving nitrogen and sulfur, but also is especially suitable for demetallizing the entering feedstock. Consequently, the first hydrodesulfurization reactor, filled with regenerated catalyst, becomes a "guard chamber" for removing vanadium and nickel contaminants which might otherwise deactivate the catalyst in the remaining reactors. Typical hydrodesulfurization conditions are generally employed so that the process is more adaptable for use in a commercial refinery, such conditions being as follows:

| Operating Conditions | Broad Range | Preferred Range |
|---|---|---|
| Temperature, °F. | 500–900 | 600–850 |
| Hydrogen Pressure, p.s.i.g. | 500–3000 | 1000–2500 |
| Space Velocity, LHSV | 0.05–3.0 | 0.1–1.5 |
| Hydrogen Recycle Rate, scf/b | 1000–15000 | 2000–10000 |

In a preferred method of operation, the hydrocarbon feedstock is passed upwardly or downwardly through a stationary bed of catalyst. Fluidized (or ebullient) beds, slurries or batch reactors can also be employed.

Typically, catalysts employed for hydrorefining hydrocarbons, if in the oxide form, are generally rendered more active by conversion to either the sulfide or free metal form. Conversion of the oxides of the active components to sulfide or free metals, if desired, can be accomplished by respectively presulfiding or prereducing the catalyst. Typical conditions for presulfiding or prereducing include passing, respectively, a sulfiding or reducing gas over the calcined catalyst at a temperature between 300° and 700° F. at a space velocity between about 150 and 400 v/v/hr for about 2 hours. Hydrogen is usually used to prereduce the catalyst while a mixture of hydrogen and one or more components selected from the group consisting of the sulfur compounds (e.g., lower molecular weight thiols, organic sulfides, especially $H_2S$) and sulfur vapor is suitable for presulfiding. Generally speaking, the relative proportion of hydrogen in the presulfiding mixture is not critical, with any proportion of hydrogen ranging between 10 and 90 percent by volume being adequate.

If the catalyst is to be used in its sulfided form, it is preferred that it be presulfided. However, since it is contemplated that the catalyst is often used under the hydrodesulfurization conditions hereinbefore recited and with feedstocks containing 1.0 weight percent or more of sulfur, the catalyst may be effectively sulfided in situ during processing of such feedstocks.

The following Examples demonstrate the method of the invention for regenerating catalytic activity of hydrodesulfurization catalysts; the Examples are not intended to limit the scope of the invention which is defined by the claims.

EXAMPLE 1

A hydrodesulfurization catalyst is prepared as described in Example 3 of U.S. Pat. No. 3,980,552 except that the finished catalyst contains 11.6 weight percent of molybdenum components, calculated as $MoO_3$, 3.75 weight percent of cobalt components, calculated as CoO, on a support comprising alumina and silica. The catalyst has a crushing strength of greater than 10 lbs/⅛ inch length, a pore volume of 0.52 ml/gram, and a surface area slightly greater than 240 m²/gram. After being used to hydrodesulfurize a residual oil feedstock over an extended period of time, the catalyst is heavily deactivated with coke, sulfur, nickel, and vanadium contaminants, and as a result, the catalyst has only about 11 percent of the desulfurization activity of fresh catalyst. As determined by emission spectroscopy techniques, the deactivated catalyst contains 8.03 weight percent of molybdenum components, calculated as $MoO_3$, 2.28 weight percent of cobalt components, calculated as CoO, 3.79 weight percent nickel and 15.60 weight percent vanadium, calculated as the free metals, 4.95 weight percent of coke, 6.11 weight percent of sulfur and the balance being alumina containing a small amount of silica, and has a crushing strength of 7.8 lbs/⅛ inch length, a pore volume of 0.23 ml/gram, and a surface area of 136 m²/gram. On a fresh catalyst calculation basis, the deactivated catalyst contains 11.6 weight percent of active molybdenum components, calculated as $MoO_3$, 3.31 weight percent of active cobalt components, calculated as CoO, 22.6 weight percent of vanadium components, calculated as V, 5.48 weight percent of nickel components, calculated as Ni, 8.83 weight percent of sulfur, and 7.2 weight percent of coke and the balance being essentially alumina containing a small amount of silica.

In accordance with the method of the invention, five equivalent 165-gram portions (825 grams total) of deactivated catalyst particulates are first rejuvenated by being contacted with 6 liters of a circulating solvent containing 1.0 M oxalic acid and 0.57 M aluminum nitrate ($Al(NO_3)_3$) for about six hours at 25° C. resulting in the removal of 70 weight percent of the vanadium contaminants and 65 weight percent of the nickel contaminants (determined by emission spectroscopy techniques).

Some of the coke is then removed and the pores of the catalyst opened by heating the rejuvenated catalyst particulates at a rate of 100° F. per hour to 500° F. in flowing air and holding for two hours. After cooling in air to an ambient temperature, two hundred grams (200 g) of the particulates are then impregnated with cobalt, molybdenum, and phosphorus components by being contacted and aged for one hour with 100 ml of an impregnating solution containing 12 grams of ammonium heptamolybdate, 8.5 grams of cobalt nitrate, and 24.5 grams of 85 percent orthophosphoric acid using the pore saturation method. The reimpregnated particulates are oven-dried 4 hours at 110° C. and heated at the rate of 100° F. increase per hour to 900° F. and held for two hours to remove most of the remaining coke and sulfur.

The cooled particulates are then crushed, mixed with 20 weight percent Catapal ™ alumina, re-extruded through a die having 1/16 inch cloverleaf openings therein, oven-dried overnight at 110° C., and calcined at 1200° F. for one-half hour in flowing air (50 SCFH). The final catalyst, referred to hereinafter as Catalyst A and regenerated in accordance with the invention, has the composition and physical properties summarized in Table II.

TABLE II

| Catalyst A | |
|---|---|
| | Wt. % |
| Composition | |
| Molybdenum, as $MoO_3$ | 9.80 |
| Cobalt, as CoO | 2.50 |
| Nickel, as Ni | 1.26 |
| Vanadium, as V | 3.79 |
| Phosphorus, as P | 3.00 |
| Sulfur, as S | 0.16 |
| Coke, as C | 0.11 |
| Physical Properties | |
| Pore volume | 0.51 ml/gram |
| Surface area | 294 m²/gram |
| Average crushing strength | 11 lbs/⅛ inch length |

EXAMPLE 2

Catalyst A of Example 1, prepared in accordance with the invention, and Catalyst B, prepared by a regeneration method of the prior art, are tested to determine their individual activities against a reference catalyst consisting of particles of a commercially available catalyst. The reference catalyst has a 1/16 inch cloverleaf maximum cross-sectional shape and has a nominal composition of 12 weight percent of molybdenum components, calculated as $MoO_3$, 4 weight percent of cobalt components, calculated as CoO, and the balance being alumina containing one weight percent silicon, calculated as $SiO_2$. The reference catalyst has a surface area of 300 m²/gram, a pore volume of 0.62 ml/gram, and an average crushing strength of 10 lbs/⅛ inch length.

Catalyst B, prepared with the deactivated catalyst described in Example 1, is regenerated by a method similar to a method described in U.S. Pat. Nos. 4,272,400 and 4,272,401. One hundred seventy-four (174) grams of deactivated catalyst particulates are sulfided with pure $H_2S$ flowing at 1 ft³/hr for 4 hours at 500° C. The catalyst is then washed for 24 hours at about 55° C. with 3500 ml of an aqueous solution containing 180 grams of molybdophosphoric acid ($H_3PMo_{12}O_{40}$), and 90 grams of hydrogen peroxide ($H_2O_2$), then removed and contacted with a second aqueous solution having the same $H_3PMo_{12}O_{40}$ and $H_2O_2$ content for another 24 hours. After drying, one hundred sixty (160) grams of the treated particulates are impregnated with an aqueous solution containing 18 grams of cobalt nitrate hexahydrate ($Co(NO_3)_2.6H_2O$) followed by at 800° F. for 2 hours. One hundred four (104) grams of the cobalt-impregnated catalyst is again impregnated with 35 ml of an aqueous solution containing 22.3 grams of $Co(NO_3)_2.6H_2O$, oven-dried at 115° C. and calcined for 2 hours at 800° F. After treatment, Catalyst B has a nominal composition of 22.7 weight percent of molybdenum components, calculated as $MoO_3$, 11.0 weight percent of cobalt components, calculated as CoO, 0.67 weight percent of phosphorus components, calculated as P, 2.54 weight percent of vanadium components and 0.47 weight percent of nickel components, both calculated as the free metals, 4.74 weight percent of sulfur components, calculated as S, 3.40 weight percent of coke, calculated as C, and the balance being alumina containing about one weight percent silicon, calculated as $SiO_2$. The catalyst has a surface area of 100 m²/gram, a pore volume of 0.35 ml/gram, and an average crushing strength of 13 lbs/⅛ inch length.

Catalysts A and B and the reference catalyst are each presulfided for about 16 to about 20 hours by contact with a gas consisting of 90 volume percent $H_2$ and 10 volume percent $H_2S$ flowing at 4.4 SCFH at one atmosphere pressure. The temperature during the presulfiding is initially at room temperature and is increased gradually until 700° F. is reached, then lowered to 550° F. until the catalyst is contacted with the feedstock.

Catalysts A and B and the reference catalyst are then tested to determine their individual hydrodesulfurization activities and temperature increase requirements (TIR), i.e., stability (or resistance to deactivation). Presulfided Catalysts A and B and the reference catalyst are each charged in separate runs to a reactor and utilized at 740° F. to hydrodesulfurize an Iranian atmospheric residua feedstock having the characteristics shown in Table III below under the following conditions: 2,000 p.s.i.g. total pressure, 1.0 LHSV, and a hydrogen rate of 6,000 SCF/B.

TABLE III

| FEEDSTOCK PROPERTIES | |
|---|---|
| Feed Description | Iranian Atmospheric Residua |
| Gravity, °API | 16.6 |
| Sulfur, wt. % | 2.61 |
| Nitrogen, wt. % | 0.347 |
| Vanadium, ppm | 113 |
| Nickel, ppm | 37 |
| Ash, ppm | 230 |
| Carbon Residue, D-189, wt. % | 6.9 |
| Asphaltenes, (UTM-86), wt. % | 6.1 |
| Pour Point, °F. | +65 |
| ASTM D-1160 Distillation, °F. | |
| IBP | 505 |
| 5 | 627 |
| 10 | 682 |
| 20 | 753 |
| 30 | 820 |
| 40 | 872 |
| 50 | 942 |
| 60 | 1033 |
| Max | 1035 |

TABLE III-continued

| FEEDSTOCK PROPERTIES | |
|---|---|
| Rec | 61.0 |

The feedstock is contacted with the described catalysts in a single-stage, single-pass system with once-through hydrogen such that the effluent sulfur and metals concentrations are maintained at 0.3 weight percent and 15 ppm, respectively, equivalent to about 90.0 percent desulfurization and about 90 percent demetallation. The temperatures required for these conversions are summarized in Table IV.

TABLE IV

| Catalyst | Catalyst Age, days | | | |
|---|---|---|---|---|
|  | 0 | 15 | 29 | 43 |
| DEMETALLATION TEMPERATURES REQUIRED, °F. | | | | |
| Reference | 744 | 780 | 800 | 820 |
| A | 740 | 780 | 805 | 825 |
| B | 785 | 830 | 875 | |
| DESULFURIZATION TEMPERATURES REQUIRED, °F. | | | | |
| Reference | 752 | 805 | 842 | 862 |
| A | 775 | 825 | 865 | 880 |
| B | 748 | 800 | 854 | |

In view of the data in Table IV relative to demetallation of the feedstock, Catalyst A is only 5° F. less active than the reference catalyst after both 29 and 43 days, and noticeably more active (~70° F.) than Catalyst B after only 29 days.

For desulfurization purposes, Catalyst A, although operating at a higher temperature, deactivates at the same rate as the reference catalyst during the first 29 days, i.e., 90° F. (TIR~3.0° F./day), and at an improved rate after 43 days, i.e., 105° F. vs. 110° F. (TIR~2.4° F./day vs. ~2.6° F./day). Moreover, Catalyst A deactivates about 105° F. over 43 days (TIR~2.4° F./day) while Catalyst B about 106° F. over only 29 days (TIR~3.6° F./day). Additionally, after 29 days, Catalyst A shows a 16° F. desulfurization improvement compared to Catalyst B.

Although the invention has been described in conjunction with a preferred embodiment and Examples thereof, it is evident that many alternatives, variations, and modifications of the invention are possible. It is intended to include within the invention all such alternatives, variations, and modifications as fall within the spirit and scope of the appended claims.

We claim:

1. A method for regenerating a deactivated hydrorefining catalyst, said hydrorefining catalyst containing a refractory oxide and having sulfur-containing coke deposits on the surface thereof, said method comprising:
   (1) contacting a phosphorus component with said catalyst, said phosphorus component selected from the group consisting of elemental phosphorus and a nonmetallic phosphorus compound, said phosphorus component incorporated in an amount such that the catalyst from step (2) comprises at least one weight percent of phosphorus, calculated as P; and
   (2) combusting said coke deposits from said catalyst obtained from step (1) such that no significant sulfation of said refractory oxide occurs.

2. The method defined in claim 1 further comprising crushing said catalyst prior to step (1), mixing said catalyst obtained from step (2) with a binding agent, forming particulates of said mixture and then calcining.

3. The method defined in claim 1 further comprising combusting part of said coke deposits from said catalyst prior to step (1).

4. The method defined in claim 1 further comprising extracting vanadium and nickel metals from said catalyst prior to step (1).

5. The method defined in claim 1 further comprising crushing said catalyst obtained from step (2), mixing said crushed catalyst with a binding agent, forming particulates and calcining said particulates.

6. The method defined in claim 1 wherein, during step (1), no substantial loss of metal contaminants from the catalyst results.

7. A method for regenerating a deactivated hydrorefining catalyst, said hydrorefining catalyst comprising a refractory oxide and having metal contaminants and sulfur-containing coke deposits on the surface thereof, which method comprises:
   (1) combusting part of said coke deposits from said deactivated catalyst;
   (2) incorporating a non-metallic phosphorus component with the catalyst obtained from step (1), said non-metallic phosphorus component incorporated in an amount such that the catalyst from step (3) comprises at least one weight percent of phosphorus, calculated as P; and
   (3) combusting a substantial proportion of the remaining coke deposits from said catalyst, said catalyst having no substantial loss of surface area as compared to said deactivated catalyst.

8. A method for regenerating a deactivated hydrorefining catalyst, said hydrorefining catalyst comprising hydrogenation metal components on a refractory oxide and having metal contaminants and sulfur-containing coke deposits on the surface thereof, which method comprises:
   (1) combusting part of said coke deposits from said deactivated catalyst;
   (2) incorporating a non-metallic phosphorus component with the catalyst obtained from step (1), said non-metallic phosphorus component incorporated in an amount such that the catalyst from step (3) comprises at least one weight percent of phosphorus, calculated as P; and
   (3) combusting a substantial proportion of the remaining coke deposits from said catalyst without substantial loss of average crushing strength as compared to said deactivated catalyst.

9. The method defined in claim 7 or 8 wherein during step (2) no substantial loss of said metal contaminants from said catalyst results.

10. The method defined in claim 7 or 8 wherein said combustion in step (1) results at a temperature of about 250° F. to about 600° F.

11. The method defined in claim 7 or 8 wherein said combustion in step (3) results at a temperature of about 600° F. to about 1500° F.

12. The method defined in claim 7 or 8 wherein said deactivated catalyst comprises cobalt and molybdenum components.

13. The method defined in claim 7 or 8 further comprising the step of extracting vanadium and nickel contaminant metals from said catalyst prior to step (1).

14. The method defined in claim 7 or 8 further comprising the step of extracting vanadium and nickel contaminant metals from said catalyst obtained from step (1).

15. The method defined in claim 13 wherein said vanadium and nickel metals are extracted by contact with an extraction solution containing oxalic acid and aluminum nitrate.

16. The method defined in claim 13 further comprises incorporating Group VIB or Group VIII metal components with said contaminant metals-extracted catalyst.

17. The method defined in claim 7 or 8 wherein said catalyst obtained from step (3) contains substantially less sulfur than said deactivated catalyst.

18. The method defined in claim 7 or 8 further comprising step (4) wherein the catalyst obtained from step (3) is crushed and mixed with a binding agent, followed by particulate formulation and calcination.

19. The method defined in claim 18 wherein said binding agent is alumina and comprises about 10 to about 25 weight percent of said catalyst obtained from step (4).

20. The method defined in claim 7 or 8 wherein the catalyst from step (3) comprises less than about 0.5 weight percent of sulfur, calculated as S.

21. The method defined in claim 7 or 8 wherein the catalyst from step (3) contains less than about 0.5 weight percent coke.

22. A method for regenerating a deactivated hydrorefining catalyst useful for hydrodesulfurization, said catalyst comprising cobalt and molybdenum components on a refractory oxide containing alumina, said catalyst further containing nickel and vanadium metal contaminants and sulfur-containing coke deposits on the surface thereof, which method comprises:
   (1) extracting vanadium and nickel components from said deactivated catalyst by contacting said deactivated catalyst with an extraction solution containing components selected from the group consisting of oxalic acid, aluminum nitrate, glycolic acid, and ammonium nitrate;
   (2) combusting part of said coke deposit from the catalyst obtained from step (1) by heating said catalyst to a temperature in the range from about 350° F. to about 550° F.;
   (3) incorporating cobalt, molybdenum, and phosphorus components with said catalyst obtained from step (2), said phosphorus component being incorporated in an amount sufficient to yield essentially no loss of surface area of said catalyst in step (4);
   (4) calcining said catalyst obtained from step (3) at a temperature in the range from about 700° F. to about 1300° F. such that a substantial proportion of said coke deposits are combusted from said catalyst without substantial loss in surface area thereof;
   (5) crushing said catalyst obtained from step (4) and mixing said crushed catalyst with alumina; and
   (6) forming said mixture obtained from step (5) into particulates and calcining.

23. The method defined in claim 22 wherein said phosphorus components are selected from the group consisting of orthophosphoric acid, metaphosphoric acid, phosphorous acid, hypophosphorous pyrophosphoric acid, ammonium hydrogen phosphate, ammonium dihydrogen phosphate, and ammonium phosphate.

24. The method defined in claim 22 wherein said phosphorus component is in an atom ratio from about 0.1 to about 4 to 1, phosphorus to vanadium.

* * * * *